Sept. 8, 1964    L. W. HERCHENROEDER    3,148,316
CONTOURING CONTROL APPARATUS
Filed Jan. 24, 1962    3 Sheets-Sheet 1

WITNESSES
John E. Healey, Jr.
Jean Schron

INVENTOR
Louis W. Herchenroeder
BY [signature]
ATTORNEY

United States Patent Office 3,148,316
Patented Sept. 8, 1964

3,148,316
CONTOURING CONTROL APPARATUS
Louis W. Herchenroeder, Penn Hills, Pa., assignor to Westinghouse Electric Corporation, East Pittsburgh, Pa., a corporation of Pennsylvania
Filed Jan. 24, 1962, Ser. No. 168,457
8 Claims. (Cl. 318—19)

This invention relates, in general, to electrical control apparatus, and in particular to electrical control apparatus for a machine member.

In the positioning control of a machine member, for example the contour or other control of a machine tool, it is often desired to have the machine tool follow a particular curvilinear path to perform a desired machining operation. In control apparatus for performing such desired operations, a tremendous amount of data is necessary to describe the feed motions of the machine over the desired path. The accuracy of such control systems is of the order of .001 of an inch, which necessitates that the machine member path must be described for every .001 of an inch of travel.

The vast majority of workpieces machined are made up of surfaces consisting of straight lines and arcs of circles. Curved paths are normally approximated by straight line segments, and if the straight line segments are replaced by circular arcs, the increments required to describe an arbitrary curve can be larger with a corresponding reduction in the amount of data that must be fed to the machine control. To this end it is desirable to specifiy the machine member path in coarse increments and have provision in the machine control for interpolating within these increments to obtain the actual commands for the system.

It is, therefore, one object of the present invention to provide improved positioning control apparatus for a machine member which functions with fewer input signals.

It is a further object to provide improved positioning control apparatus for a machine member which apparatus will better control the machine member over a desired curvilinear path.

A further object is to provide improved positioning control apparatus for a machine member which apparatus will better correct any deviation by the machine member from a desired curvilinear path.

In accordance with the objects of the invention, there is provided a machine member capable of being driven in accordance with a plurality of coordinates by drive motors, one for each coordinate. Since a curvilinear path may be a circular path, or a series of circular paths having different radii, input signals are fed into the system indicative of the desired circular path and may comprise, for example, signals representative of the center of the desired circle, signals representative of the desired peripheral velocity, signals representative of the coordinates of a new desired position, and a signal representative of the radius of the desired circle. As the machine member is driven in a desired direction, positioning signals are produced which are representative of the movement, and therefore the actual position of the machine member. These positioning signals may be compared with an input signal to obtain positional difference signals which are fed into an accumulator device after being gated by the positioning signals produced by movement of the machine member. These positional difference signals may also be utilized along with the desired peripheral velocity signal to obtain a drive signal which will move the machine member along the desired circular path. If the machine member is following the desired path, the output of the accumulator device will be substantially zero. If, however, the machine member deviates from the desired path, the accumulator device will produce an output signal which may be mathematically shown to be a function of the error, or deviation of the machine member from the desired path. This error signal may then be combined with the input radius signal to obtain a deviation error correction signal which is utilized to modify the speed of the coordinate motors to thereby bring the machine member back to its desired path. When the machine member reaches its new desired position, this condition is sensed and a new set of commands may be fed into the system.

The above-stated, and further objects of the present invention will become apparent upon a reading of the specification and reference to the drawings, in which.

Figure 1:
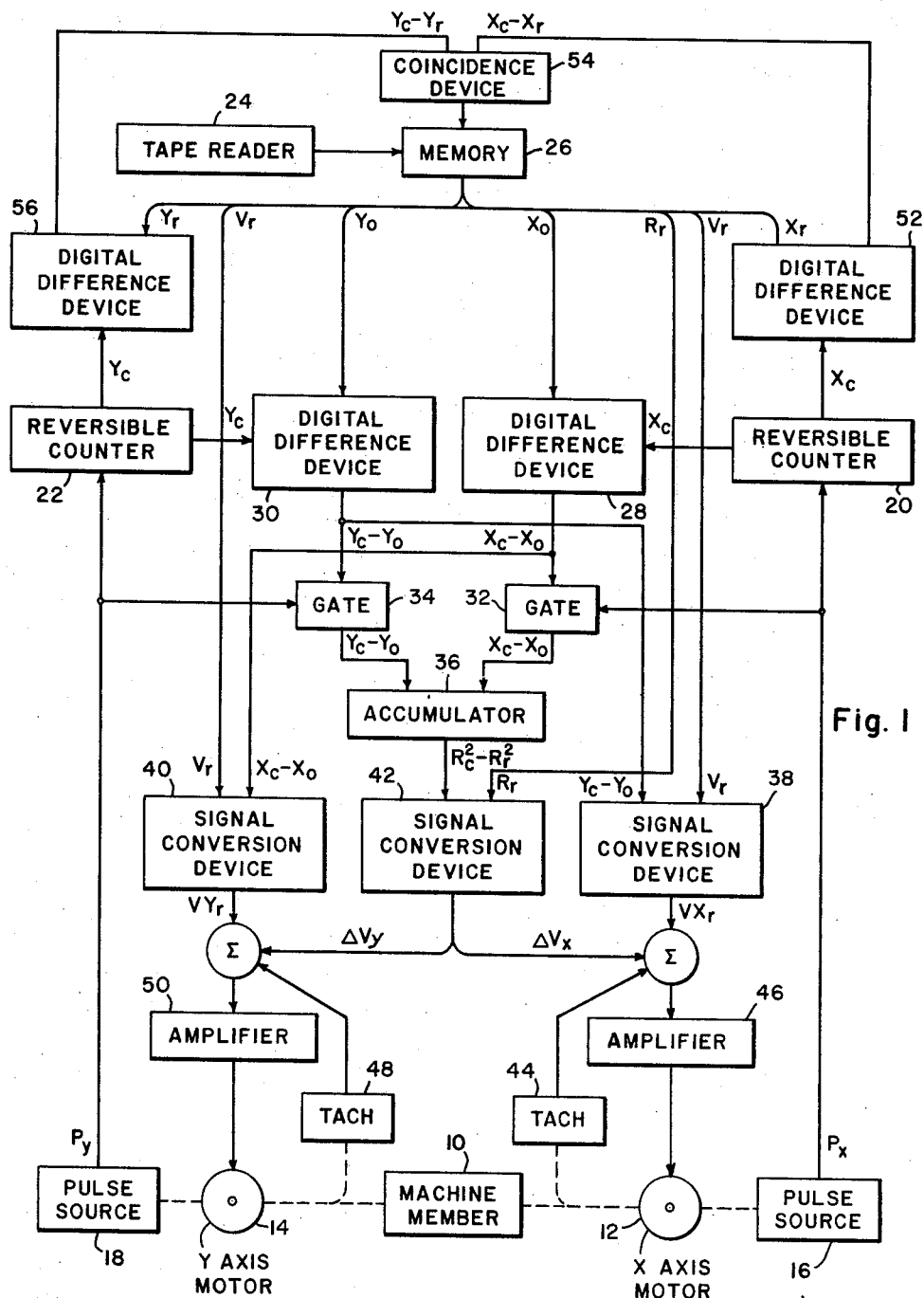
FIGURE 1 shows a control apparatus in accordance with the present invention.

Referring now to FIG. 1, machine member 10 is capable of being driven in a desired direction by an X axis motor 12 and a Y axis motor 14. For simplicity, only two such drive motors are shown, although it is to be understood that the system is capable of operation in a third dimension by adding a suitable third, or Z axis driving means. Since motion in a plane can be resolved into an X coordinate movement and a Y coordinate movement, there is provided means for producing positional feedback signals proportional to the movement of the machine member in an X direction and in a Y direction, which means may take the form of pulse sources 16 and 18. The pulse source 16 may be arranged to produce a signal, or pulse indicative of movement and direction of movement, every time the machine member 10 moves an incremental distance along the X coordinate. By way of example, the pulse source 16 may produce a pulse for every incremental movement of .001 of an inch by the machine member 10 along the X coordinate. Pulse source 18 likewise produces a pulse for every .001 of an inch movement of the machine member 10 along the Y coordinate. These pulses, or actual positioning signals produced by pulse source 16, may be fed back into a storage device such as reversible counter 20 in order to provide a signal which is the summation of all the actual positioning signals and which is indicative of the actual position of the machine member along the X coordinate. Similarly, the counter 22 is operative with the pulses received from the pulse source 18 to provide a signal which is indicative of the actual position of the machine member 10 along the Y coordinate.

A tape reader 24 or the like, is provided to read prepunched information on an input tape and deliver it to a memory device 26, where the information is stored until it is used by the control apparatus. If it is desired to have the machine member 10 follow a desired path from a first position, $X_cY_c$, to a new position $X_rY_r$, along a circular path having its center at a coordinate position of $X_oY_o$ and having a desired radius $R_r$, the output of the memory device 26 may supply these desired signals in addition to a signal $V_r$ indicative of a desired peripheral velocity. The actual position signal $X_c$ from the reversible counter 20 and the signal $X_o$ representing the X coordinate of the center of the circular path may be fed into a subtracting signal comparison device such as digital difference device 28 for the purpose of obtaining an X coordinate positional difference signal. Likewise, the digital difference device 30 is operable with the actual Y position signal $Y_c$ from reversible counter 22 and with the signal $Y_o$, representing the Y coordinate of the center of the desired circular path, to produce a Y coordinate positioned difference signal.

In order to give a positional error signal, designated as $R_c^2-R_r^2$, a storage device such as accumulator 36 is provided for comparing the above positional difference signals. The X coordinate positional difference signal $X_c-X_o$ is fed into the accumulator 36 through gate device 32 which transmits the $X_c-X_o$ signal each time it is pulsed by a pulse from the source 16. Gate device 34 is similarly operable with the pulses from the source 18 to pass the Y coordinate positional difference signal $Y_c-Y_o$ to the accumulator 36 each time the gate 34 is pulsed.

It may be demonstrated that if the velocity in the Y direction is proportional to X and the velocity in the X direction is proportional to $-Y$, a circular path will be described. To this end the driving means for the X axis motor 12 includes a signal conversion device 38 which is operable with the peripheral velocity signal $V_r$ and with the Y coordinate positional difference signal $Y_c-Y_o$ to provide a control signal $VX_r$, and similarly signal conversion device 40 is operable with the peripheral velocity signal $V_r$ and the X coordinate positional difference signal $X_c-X_o$ to provide control signal $VY_r$ to Y axis motor 14, the combination of which signals will tend to drive machine member 10 in its desired circular path.

The positional error signal $R_c^2-R_r^2$ will appear at the output of the accumulator 36 if the machine member deviates from its desired path. The positional error signal $R_c^2-R_r^2$ will hereinafter be shown to be a function of the deviation error and when combined with a predetermined signal representative of the circular path such as the signal $R_r$ which denotes the radius parameter of that circular path, in a signal comparing conversion device 42, a controlling correction or deviation error signal will be produced to modify the speed of the motors 12 and 14, which in turn corrects any deviation of the machine member 10 from its desired circular path.

In order to provide greater accuracy utilizing a closed loop speed control, tachometer 44 is provided to produce a signal proportional to the speed of the X axis motor 12 and which signal is summed with the driving signal $VX_r$ from signal conversion device 38 and any correction signal $\Delta V_x$ from signal conversion device 42, the totality of signals being amplified by amplifier 46 to drive the motor 12. Similarly, the tachometer 48 associated with the Y axis motor 14 produces a signal which is summed with the signal $VY_r$ from signal conversion device 40 and with any correction signal $\Delta V_y$ from signal conversion device 42, the totality of signals being amplified by amplifier 50 to drive motor 14.

When the machine member 10 reaches its new coordinate position $X_rY_r$, the memory device 26 may supply a new set of command signals to the control apparatus. Means are provided to sense this condition and include a digital difference device 52 operative with the actual positional signal $X_c$ from reversible counter 20 and with the new desired X coordinate input signal $X_r$ to provide a difference signal $X_c-X_r$ which is fed into a coincidence device 54. Digital difference device 56 is similarly operative with the actual positional signal $Y_c$ and the new desired Y coordinate positional signal $Y_r$ to provide a difference signal $Y_c-Y_r$ which is also fed into the coincidence device 54, and when these signals reach a predetermined value, the coincidence device 54 will provide an output signal which is fed into the memory device 26 to call for a new set of signals.

Figure 2:
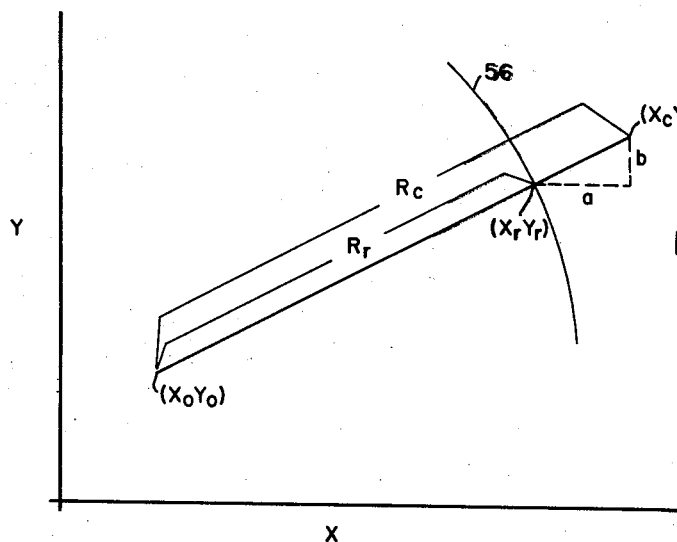
FIG. 2 is a graph to assist in understanding the mathematical derivation of the error equation.

If the machine member 10 deviates from its desired circular path, the accumulator 36 will produce an output $R_c^2-R_r^2$ which is utilized to obtain an error, or correction signal. In order to aid in the understanding of the derivation of the error signal, reference is now made to FIG. 2 which shows a desired circular path 56. $X_oY_o$ represents the coordinates of the center of the circular path and $R_r$ represents the radius. The point $X_rY_r$ lies on the curve 56 and $X_cY_c$ represents a deviation from the curve 56 and which point lies on a circle having the radius $R_c$. The equation for the circle on which point $X_cY_c$ lies is:

$$R_c^2=(X_c-X_o)^2+(Y_c-Y_o)^2 \quad \text{(Equation 1)}$$

since the deviation may be on either side of $X_r$:

$$X_c=X_r\pm a \text{ and } Y_c=Y_r\pm b$$

substituting, and subtracting $R_r^2$ in Equation 1.

$$R_c^2-R_r^2=(X_r\pm a-X_o)^2+(Y_r\pm b-Y_o)^2-R_r^2$$

$$R_c^2-R_r^2=(X_r-X_o)^2\pm 2a(X_r-X_o)+a^2$$
$$+(Y_r-Y_o)^2\pm 2b(Y_r-Y_o)+b^2-R_r^2$$

Since $$R_r^2=(X_r-X_o)^2+(Y_r-Y_o)^2$$

and $$R_c^2-R_r^2=(R_c-R_r)(R_c+R_r)$$

$$R_c-R_r=\frac{\pm 2a(X_r-X_o)+a^2\pm 2b(Y_r-Y_o)+b^2}{R_c+R_r}$$

$$\text{(Equation 2)}$$

Equation 2 represents the error.

In order to correlate the error with the pulses $P_x$ and $P_y$ let:

$$f(X)=\pm 2P_x(X_c-X_o)+P_x^2$$

and $$f(Y)=\pm 2P_y(Y_c-Y_o)+P_y^2$$

$P_x=P_y=\pm 1=$ the smallest unit of measure used in the system. Taking the summation of $f(X)$ as $X_c$ progresses from $X_r$ to $X_r+a$:

$$\sum_{X_c=X_r}^{X_c=X_r+a} f(X)$$

$$=[2P_x(X_r-X_o)+P_x^2]+[2P_x(X_r+P_x-X_o)+P_x^2]$$
$$+\cdots [2P_x(X_r+\{n-1\}P_x-X_o)+(P_x)^2]$$
$$+\cdots [2P_x(X_r+\{a-1\}P_x-X_o)+(P_x)^2]$$

$$F(X)=\sum_{n=1}^{n=a}[2P_x(X_r+\{n-1\}P_x-X_o)+(P_x)^2]$$

$$\text{(Equation 3)}$$

performing the summation:

$$F(X)=a\left[2P_x\left(\frac{X_r+X_r+a-1P_x}{2}-X_o\right)+P_x^2\right]$$

$$=2aP_x(X_r-X_o)+a(a-1)(P_x)^2+a(P_x)^2$$

$$=2aP_x(X_r-X_o)+a2(P_x)^2$$

since $P_x=\pm 1$:

$$F(X)=\pm 2a(X_r-X_o)+a^2 \quad \text{(Equation 4)}$$

If at point $X_r$, it would take $n$ pulses to reach $X_c$, it may be seen that:

$$X_r+(n-1)P_x=X_{c_{n-1}}$$

substituting in Equation 3:

$$F(X)=\sum_{n=1}^{n=a}2P_x(X_{c_{n-1}}-X_o)+(P_x)^2=\pm 2a(X_r-X_o)+a^2$$

similarly:

$$F(Y)=\sum_{n=1}^{n=b}[2P_y(Y_{c_{n-1}}-Y_o)+P_y^2]=\pm 2b(Y_r-Y_o)+a^2$$

substituting in Equation 2, $$\text{Error}=R_c-R_r$$

$$=\frac{\sum_1^a[2P_x(X_{c_{n-1}}-X_o)+P_x^2]+\sum_1^b[2P_y(Y_{c_{n-1}}-Y_o)+P_y^2]}{R_c+R_r}$$

$$\text{(Equation 5)}$$

the value of $X_c$ at a point $n-1$ equals $X_c$ subtracted by one pulse i.e.: $X_{c_{n-1}}=X_c-P_x$ substituting $X_c - P_x$ for $X_{c_{n-1}}$ in Equation 5

$$\text{Error} = R_c - R_r$$

$$= \frac{\sum_1^a [2P_x(X_c - P_x - X_o) + P_x^2] + \sum_1^b [2P_y(Y_{c_{n-1}} - Y_o) + P_y^2]}{R_c + R_r}$$

$$= \frac{\sum_1^a [2P_x(X_c - X_o) - P_x^2] + \sum_1^b [2P_y(Y_{c_{n-1}} - Y_o) + P_y^2]}{R_c + R_r}$$

$$= \frac{\sum_1^a [2P_x(X_c - X_o)] + \sum_1^b [2P_y(Y_{c_{n-1}} - Y_o)]}{R_c + R_r}$$

$$+ \frac{\sum_1^a -(P_x)^2 + \sum_1^b (P_y)^2}{R_c + R_r}$$

(Equation 6)

For small deviations $R_c \simeq R_r$ therefore:

$$R_c + R_r \simeq 2R_r$$

Over any half circle the number of $P_x$ pulses would equal the number of $P_y$ pulses and the second quantity on the right-hand side of Equation 6 would sum to zero. For arcs less than a half circle the value of the second quantity would be less than one and since this is less than the smallest unit of measure in the control system it may be ignored. Therefore:

$$\text{Error} = R_c - R_r \simeq \frac{\sum_1^a P_x(X_c - X_o) + \sum_1^b P_y(Y_{c_{n-1}} - Y_o)}{R_r}$$

(Equation 7)

or by a similar process, $$\text{Error} = R_c - R_r \simeq \frac{\sum_1^a P_x(X_{c_{n-1}} - X_o) + \sum_1^b P_y(Y_c - Y_o)}{R_r}$$

(Equation 8)

It may be seen that Equation 7 represents a close approximation of the error. In the left-hand term of the numerator, $X_c - X_o$ represents the X coordinate positional difference signal produced by digital difference device 28 and $P_x$ represents the pulses produced by pulse source 16. In the right-hand term of the numerator of Equation 7, $Y_{c_{n-1}} - Y_o$ represents the positional difference signal produced by digital difference device 30, and $P_y$ represents the pulses produced by pulse source 18. It is to be understood that by a suitable delay device built into the Y coordinate system the quantity $Y_{c_{n-1}} - Y_o$ will be produced by the digital difference device 30 although FIG. 1 shows the generic positional difference signal $Y_c - Y_o$. The division operation by the radius $R_r$ takes place in the signal conversion device 42 which provides the control correction signal designated as $\Delta V_x$ and $\Delta V_y$. By similar reasoning Equation 8 may be utilized with a suitable delay built into the X coordinate system.

Figure 3:
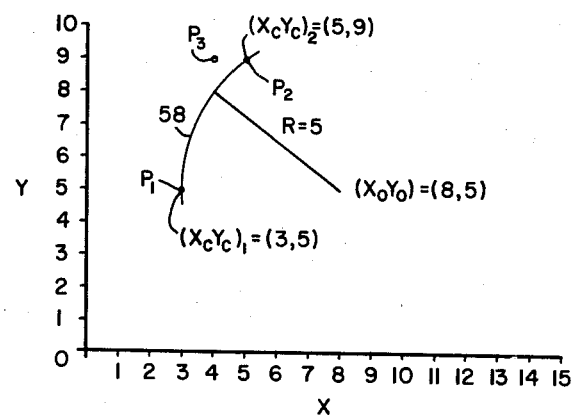
FIG. 3 is a graph illustration showing an actual position of a machine member, a new desired position of that machine member and a desired path along with the machine member is to be moved.

For a clearer understanding of the operation of the present invention, reference is now made to FIG. 3 which shows an actual position $P_1$ having an XY coordinate of 3, 5, a new desired position $P_2$ having an XY coordinate of 5, 9 and a desired curve 58 along which the machine member is to travel having a radius of five units and a center having the coordinates of 8, 5. Each unit may represent the distance the machine member must travel in order for a pulse to be produced, and may be for example .001 of an inch. In traveling from $P_1$ to $P_2$, the average positional difference signals gated into the accumulator 36 is as follows:

At $P_1$: $(X_c - X_o)_1 = 3 - 8 = -5$; $(Y_c - Y_o)_1 = 5 - 5 = 0$

At $P_2$: $(X_c - X_o)_2 = 5 - 8 = -3$; $(Y_c - Y_o)_2 = 9 - 5 = 4$ the average X positional difference signal produced going from $P_1$ to $P_2$ is:

$$\frac{(X_c - X_o)_1 + (X_c - X_o)_2}{2} = \frac{(-5) + (-3)}{2} = -4$$

The average Y positional difference signal produced going from $P_1$ to $P_2$ is:

$$\frac{(Y_c - Y_o)_1 + (Y_c - Y_o)_2}{2} = \frac{(0) + (4)}{2} = 2$$

In going from $P_1$ to $P_2$ two $P_x$ pulses are produced and the average quantity gated into accumulator 36 is:

$$P_x(-4) = 2(-4) = -8$$

In going from $P_1$ to $P_2$ four $P_y$ pulses are produced and the average quantity gated into accumulator 36 is:

$$P_y(2) = 4(2) = 8$$

It may be seen that the quantities gated into the accumulator 36 sum to zero and no error signal is produced to modify the speeds of the drive motors 12 and 14.

If, however, the machine member deviates from its desired path 58 to, for example, point $P_3$, the positional signals gated into accumulator 36 would be as follows:

At $P_1$: $(X_c - X_o)_1 = 3 - 8 = -5$; $(Y_c - Y_o)_1 = 5 - 5 = 0$

At $P_3$: $(X_c - X_o)_3 = 4 - 8 = -4$; $(Y_c - Y_o)_c = 9 - 5 = 4$

The average X positional difference signal produced going from $P_1$ to $P_3$ is:

$$\frac{(X_c - X_o)_1 + (X_c - X_o)_3}{2} = \frac{(-5) + (-4)}{2} = -4.5$$

The average Y positional difference signal produced going from $P_1$ to $P_3$ is:

$$\frac{(Y_c - Y_o)_1 + (Y_c - Y_o)_3}{2} = \frac{0 + 4}{2} = 2$$

In going from $P_1$ to $P_3$ one $P_x$ pulse is produced and the average quantity gated into accumulator 36 is $$P_x(-4.5) = 1(-4.5) = -4.5$$

In going from $P_1$ to $P_3$ four $P_y$ pulses are produced and the average quantity gated into accumulator 36 is:

$$P_y(2) = 4(2) = 8$$

It may be seen in this instance that the quantities gated into the accumulator 36 do not sum to zero and an output is produced which is a function of the error. This output error is mathematically divided by the radius $R_r$ in the signal conversion device 42 to obtain the correction signals $\Delta V_x$ and $\Delta V_y$.

Figure 4:
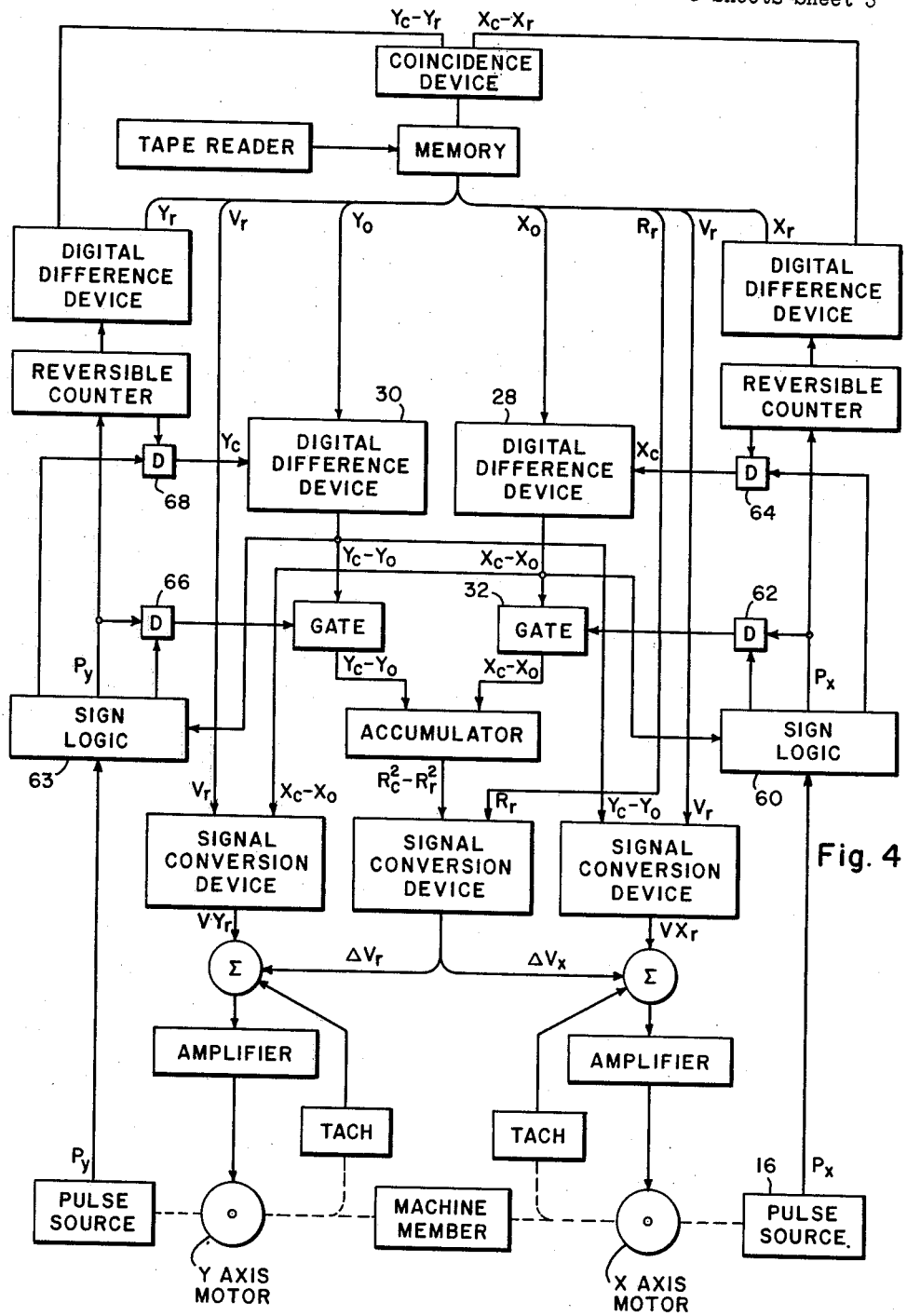
FIG. 4 shows a modification of the control apparatus of FIG. 1.

In the modification of the control apparatus shown in FIG. 4, additional circuitry has been included and is designated as sign logic 60 relative to the X coordinate and sign logic 63 relative to the Y coordinate. Sign logic 60 senses the pulses produced by pulse source 16 in addition to the output of the digital difference device 28 to control delay devices 62 or 64. Sign logic 60 functions in a predetermined manner, and if, for example, Equation 7 is being utilized, the output of the digital difference device 28 is increased by a $P_x$ pulse and then gated by that same $P_x$ pulse after being delayed by delay device 62. If Equation 8 is being utilized in the control system, the output of the digital difference device 28 may be gated to the accumulator 36 after which it will have its output changed by a $P_x$ pulse delayed by delay device 64. A predetermined operation may be governed relative to the Y coordinate utilizing sign logic 63 and delay devices 66 and 68.

The present application is related to a copending application, now issued as U.S. Patent No. 3,099,781, by the same inventor and assigned to the same assignee.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

I claim as my invention:

1. Positioning apparatus for controlling the movement of the member along separate co-ordinate axes to describe a desired circular path and comprising in combination, first and second signal sources for producing respective first and second co-ordinate actual position signals, first and second differencing devices respectively operative with said first and second actual position signals and with first and second input signals representative of the co-ordinates of the center of a circle having the same radius as said desired circular path for providing first and second difference signals, a comparison device for providing a positional error signal, first gating means responsive to said first actual position signal and operative to transfer said first difference signal to said comparison device and second gating means responsive to said second actual position signal and operative to transfer said second difference signal to said comparison device for providing said error signal, first converter means responsive to said second difference signal and a third input signal representative of a desired circular velocity for producing a first control signal, second converter means responsive to said first difference signal and said third input signal for producing a second control signal, and driving means responsive to said first and second control signals and said error signal for controlling the movement of said member.

2. Positioning apparatus for controlling the movement of a machine member along a plurality of co-ordinates to describe a curvilinear path and comprising in combination, first and second positional feedback means for providing first and second actual co-ordinate positional signals, first and second differencing devices respectively operable with said first and second actual co-ordinate positional signals and with first and second co-ordinate input signals representative of the center of said curvilinear path for providing respective first and second co-ordinate difference signals, a comparison device, first and second gating means responsive to said first and second actual co-ordinate positional signals and being respectively operable to pass said first and second difference signals to said comparsion device for providing a first error signal, signal operational means for receiving said first error signal and an input signal representative of the radius of said curvilinear path to provide a second error signal, driving means for driving said machine member substantially along said curvilinear path and being responsive to said second error signal for correcting any deviation error of said machine member from said curvilinear path.

3. Control apparatus for positioning a machine member along a desired curvilinear path and comprising in combination, signal feedback means operative with said machine member for producing an actual positioning signal, a first comparison device operable to receive said actual positioning signal and a first input signal representative of a co-ordinate position to provide a first co-ordinate differenec signal, signal means for producing at least a second co-ordinate difference signal, a second comparison device responsive to the actual position of said machine member and operable to receive said first and second co-ordinate difference signals for producing an error signal, a third comparison device for receiving said error signal and a second input signal representative of a predetermined radius of said curvilinear path to provide a control signal, machine member drive means responsive to said control signal and to a provided co-ordinate velocity signal for driving said machine member along said desired curvilinear path, and coincidence means responsive to at least the actual position of said machine member for stopping said machine member at the end of its desired path of travel.

4. Apparatus for controlling a machine member along a circular path having at least two co-ordinates and comprising in combination, machine member drive means, signal means for providing a control signal representative of said circular path for driving said machine member in said circular path, signal difference means coupled to said machine member for obtaining a plurality of co-ordinate positional difference signals, signal comparison means operative with said positional difference signals for obtaining a positional error signal, and signal converter means responsive to said positional error signal and to said control signal representative of said circular path to provide a correction signal for correcting any deviation of said machine member from said circular path.

5. Positioning apparatus for controlling the movement of a motor driven member along separate co-ordinate axes to describe a desired movement path and comprising in combination, first and second signal means for providing respective first and second co-ordinate actual position signals, first and second signal differencing devices respectively operative with said first and second actual position signals and with first and second input signals representative of said desired movement path for providing first and second movement control signals, a comparison device for providing a positional error signal, first gating means responsive to said first actual position signal and operative to transfer said first movement control signal to said comparison device and second gating means responsive to said second actual position signal and operative to transfer said second movement control signal to said comparison device for providing said error signal, first converter means responsive to said second movement control signal and a third input signal representative of a desired movement velocity for producing a first motor control signal, second converter means responsive to said first movement control signal and said third input signal for producing a second motor control signal, and driving motor means responsive to said first and second motor control signals and said error signal for controlling the movement of said member.

6. Positioning apparatus for controlling the movement of a machine member along a plurality of co-ordinates to describe a predetermined path and comprising in combination, first and second positional feedback means for providing first and second positional signals, first and second differencing devices respectively operable with said first and second positional signals and with first and second input signals representative of at least two co-ordinates of said predetermined path for providing respective first and second positional difference signals, a signal comparison device, first and second gating means operative respectively with said positional feedback means and responsive to said first and second positional signals and being respectively operable to pass said first and second difference signals to said signal comparison device for providing a first error signal, signal operational means for receiving said first error signal and a third input signal representative of a parameter of said path to provide a second error signal, driving means for driving said machine member substantially along said path and being responsive to said second error signal for correcting any movement deviation of said machine member from said predetermined path.

7. Control apparatus for positioning a machine member along a desired curvilinear path and comprising in combination, signal feedback means operative with said machine member for producing an actual position change signal, a first comparison device operable with said actual position change signal and a first input signal representative of a co-ordinate position to provide a first co-ordinate difference signal, a second comparison device responsive to the actual position change of said machine member and operable to receive at least said first co-ordinate difference signal for producing an error signal, a signal conversion device for receiving said error signal and a second input signal representative of a radius of said curvilinear path to provide a control signal, machine member drive means responsive to said control signal and to a co-ordinate velocity signal for driving said machine member along said desired curvilinear path, and coincidence means responsive to the actual position of said machine member for stopping said machine member at the end of its desired path of travel.

8. Apparatus for controlling a machine member along a predetermined path having at least two co-ordinates and comprising in combination, machine member drive means, means for providing a position control signal representative of said path for driving said machine member along said path, means coupled to said machine member for obtaining a plurality of positional difference signals, signal comparison means operative with said positional difference signals for obtaining a positional error signal, and signal conversion means responsive to said error signal and to said position control signal representative of said predetermined path to provide a correction signal for correcting any deviation of said machine member from said path.

References Cited in the file of this patent

UNITED STATES PATENTS

| | | |
|---|---|---|
| 2,820,187 | Parsons et al. | Jan. 14, 1958 |
| 2,887,638 | Cail et al. | May 19, 1959 |
| 3,035,216 | Rhoades et al. | May 15, 1962 |